United States Patent
Miller et al.

(10) Patent No.: US 9,466,996 B2
(45) Date of Patent: Oct. 11, 2016

(54) DECORATIVE AND WEARABLE POWER CHARGER WITH FLASHLIGHT FEATURE

(71) Applicants: Garold C. Miller, Glastonbury, CT (US); Nathan Daniel Weinstein, Glastonbury, CT (US)

(72) Inventors: Garold C. Miller, Glastonbury, CT (US); Nathan Daniel Weinstein, Glastonbury, CT (US)

(73) Assignee: Halo2Cloud, LLC, Glastonbury, CT (US)

( * ) Notice: Subject to any disclaimer, the term of this patent is extended or adjusted under 35 U.S.C. 154(b) by 162 days.

(21) Appl. No.: 14/465,272

(22) Filed: Aug. 21, 2014

(65) Prior Publication Data

US 2015/0155730 A1      Jun. 4, 2015

Related U.S. Application Data

(60) Provisional application No. 61/868,174, filed on Aug. 21, 2013.

(51) Int. Cl.
  *H02J 7/00* (2006.01)
(52) U.S. Cl.
  CPC ...... *H02J 7/0045* (2013.01); *H02J 2007/0049* (2013.01)
(58) Field of Classification Search
  CPC ................. H02J 7/0049; H02J 7/0045; H02J 2007/0049
  See application file for complete search history.

(56) References Cited

U.S. PATENT DOCUMENTS

| | | |
|---|---|---|
| D628,153 S | 11/2010 | Fuji et al. |
| 7,942,691 B1 | 5/2011 | McSweyn |
| D656,096 S | 3/2012 | Sasada et al. |
| D659,094 S | 5/2012 | Brand et al. |
| D663,684 S | 7/2012 | Yang |
| D663,685 S | 7/2012 | Yang |
| D671,858 S | 12/2012 | Cobbett et al. |
| D677,190 S | 3/2013 | Cobbett et al. |
| D680,063 S | 4/2013 | Sasada |
| D684,082 S | 6/2013 | Alvarez et al. |
| 8,491,330 B2 | 7/2013 | McSweyn |
| 2001/0019598 A1 | 9/2001 | Pyles |
| 2008/0238356 A1* | 10/2008 | Batson ............... H02J 7/0045 320/103 |
| 2010/0109602 A1* | 5/2010 | Chang ............... H02J 7/0054 320/103 |
| 2011/0156646 A1* | 6/2011 | Liu ............... H01M 2/1055 320/110 |
| 2012/0238132 A1 | 9/2012 | McSweyn |
| 2013/0076298 A1* | 3/2013 | Miller ............... H02J 7/0027 320/103 |
| 2014/0135955 A1 | 5/2014 | Burroughs |
| 2014/0369541 A1* | 12/2014 | Miskin ............... H04R 5/02 381/334 |

* cited by examiner

*Primary Examiner* — Vuthe Siek
(74) *Attorney, Agent, or Firm* — McCormick, Paulding & Huber LLP

(57) ABSTRACT

A portable power charger having an internal rechargeable battery includes a charger housing having at least one power connection port and a flashlight feature having at least one light source. The power connection port is operatively connected to the rechargeable battery and used for connecting the charger with an external power source, an electronic device, or both. The flashlight feature is also operatively connected to the internal battery. The charger housing takes the form of a fashion accessory that can be worn by the user, making the power charger readily available and accessible when needed to charge an electronic device when a standard power source is not available. The charger housing can be opened or folded to expose the power connection port for use, and closed or unfolded to hide the power connection port so as not to detract from the charger's use as a fashion accessory.

16 Claims, 4 Drawing Sheets

DECORATIVE AND WEARABLE POWER CHARGER WITH FLASHLIGHT FEATURE

CROSS REFERENCE TO RELATED APPLICATION

This application claims the benefit of U.S. Provisional Application No. 61/868,174, filed Aug. 21, 2013, which is incorporated herein by reference.

FIELD OF INVENTION

The present invention generally relates to power chargers for electronic devices, and more particularly relates to a decorative portable power charger that can be worn as a personalized accessory, such as a bracelet, having a flashlight feature and other features that improve upon its use and functionality.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically require connection to an external power source, such as a wall outlet, a car charger, an airplane charger, or a computer, for recharging. However, many times, such a power source is not readily available or close by, and the electronic device has insufficient charge remaining before the user can get to a power source to connect the device. Moreover, even when the device is connected to an external power source for recharging, it is difficult to continue using the device, as the device need to remain tethered to the power source.

Similarly, a separate charging cable is usually required for connecting an electronic device with a particular power source. For example, a consumer will have one cable for charging a phone at home with an AC wall socket, and another cable for charging the phone in the car using the DC car charging socket, and perhaps additional cables for charging the phone using a computer or on an airplane. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may not always be in a place where a power source is readily available, for example, if they are at the park, or may not have the appropriate cable or adapter available to use with a particular power source, for example, they are in the office but left their charging cable at home, or may be without sufficient power to recharge a phone or other device due to bad weather or a power outage.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable with her at the time. As noted, if the phone is plugged into a traditional power source, like a wall socket, it is difficult to continue using the phone as desired. Accordingly, what is needed is a power charger, even with a small boost of power, that is as portable as the electronic device and preferably easy to carry with the electronic device, and thus easily usable on-the-go.

Further, portable power chargers designed for use on-the-go must be suitable to a variety of conditions, as they are often most in need where a standard external power source is not available, and thus often needed when there is no power at all. For example, a portable power charger is especially useful when walking, camping, at the park, at the mall, or at a sporting event, where one may need to use a phone in an emergency situation. On occasion, it may be dark when the charger is needed, and thus there is insufficient ambient light to assist in use of the charger or the electronic device needed a power boost. Accordingly, there is a need for a portable charger with the versatility of providing a light to assist in use of the power charger to connect to an electronic device needing a charge, or simply as a flashlight to help the user in a time of need even when the power charger is not yet needed.

Still further, even portable power chargers are easy to lose track of and should be easy to locate especially when power is running out on a phone or other electronic device. Accordingly, there is a need for a portable charger that is easy to use and find—for example, one that can be worn by the user. In this regard, the charger does not take up additional space in one's pocket or purse and is readily accessible whenever needed, especially for that small boost of power to continue an activity on an electronic device in a time of need. Additionally, such a portable charger can be a fashion accessory so as not to detract from one's wardrobe while still providing functional assistance to recharge various portable electronic devices.

Additionally, such portable charger devices typically require a dedicated input port for recharging the internal battery and a separate output port dedicated for recharging electrical devices from the internal battery. More particularly, such charging devices often require multiple output ports for recharging multiple electronic devices at the same time. The addition of extra charging ports compromises the size and design of the charger unit, for example, a unit with a dedicated input port and two or more output ports would need to be larger than a charger unit with just a single port due to the need to properly arrange the electronics for operation of the charger as desired.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable, has a compact size, and is easy to use in various conditions and locations to charge one or more electronic devices simultaneously, including but not limited to in a house or office, a car or an airplane. Still further, there is a need for a portable charger having a port or power connector that can act both as an input for recharging an internal battery unit in the charger and as an output for recharging an electronic device connected to the charger. Still further, there is a need for a portable charger that can recharge the internal battery from an external power source at the same time as an electronic device connected to the charger, even while both the external power source and the electronic device are connected to the charger through the same port. Still further, there is a need for a portable charger unit in a compact size that has increased functionality for a user requiring a portable source of power. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a compact, decorative and wearable portable charger is provided for charging an electronic device on-the-go. In general, a portable charger unit may comprise a portable charger housing having an internal rechargeable battery unit for connecting to and recharging one or more electronic device, as necessary, and a power connection female port and/or a power connection male interface for connecting the charger unit with at least one electronic device, or an external power source, or both.

In a first aspect of the present invention, the charger unit comprises a charger housing and a rechargeable battery unit disposed therein and operatively connected to at least one power connection port that can operate as either a power input (for providing an electrical charge from an external power source for recharging the internal battery unit when the charger unit is connected to the external power source) or a power output (for charging the internal batteries of other electronic devices from the rechargeable battery unit) or both. The charger housing further comprises at least one light powered from the internal battery unit, and a controller for controlling operation of the internal battery and light(s).

In a second aspect of the present invention, the charger unit comprises a charger housing having a dedicated power input connection port for recharging the internal battery unit when the charger is connected to an external power source, and a dedicated power output connection port for recharging the internal batteries of electronic devices connected to the charger unit.

In another aspect of the present invention, the charger unit uses a power connection port that can operate as a two-way charging interface. A rechargeable battery unit is disposed within the charger housing and is operatively connected with the power connection port, which may act as a power input (for providing an electrical charge from an external power source for recharging the internal battery unit when the charger unit is connected to the external power source), and which may act as a power output (for charging the internal batteries of other electronic devices from the rechargeable battery unit). The charger further includes a controller or processing unit that determines which operational mode the power connection port is in based on what is connected to the port.

In yet another aspect of the present invention, a power connector cable is disposed within the charger housing, and can be extended from the charger housing for use to connect to an external power source, an electronic device, or both, as desired, and then retracted back within the charger housing when not needed. For example, where the charger housing has the shape of a bracelet that can be opened or folded for use as a charger, the power connector cable can be exposed when the charger housing is so opened or folded. In embodiments of the present invention, the charger can include both a power connection port and a power connector cable, both of which can be exposed for use when the charger housing is opened or folded, with the cable even being removable for use with the port. In still further embodiments, the charger can include both a power connection interface and a power connector cable, both of which can be exposed for use when the charger housing is opened of folded, with the cable even being removable for use with the interface.

In a preferred design of the portable power charger, the charger housing takes the form of a fashion accessory, such as a bracelet or loop, that can be worn by the user to increase its portability and ensure that it is available when a power charge is needed for one or more electronic devices. The power connection port(s)/interface(s) can be hidden within the shape and body of the bracelet, which can be opened or folded to expose the port(s)/interface(s) for use. One or more lights, preferably light emitting diode (LED) lights can be positioned around the perimeter of the charger housing for use as a flashlight to illuminate objects or spaces, or assist in use of the charger to connect an electronic device needing a charge.

The charger unit is portable as a result of the small size of the housing. Despite the small size of the unit, the power capacity is very high so that the charger can accommodate multiple electronic devices at the same time via a common power connection port. Similarly, the charger can utilize a common two-way power connection port to connect the internal battery unit to an external power source for recharging while simultaneously connecting the charger to one or more electronic devices for recharging via the power connection port.

In preferred embodiments of the present invention, the charger unit automatically turns on when it is connected with an electronic device needing charging. More particularly, the charger unit detects the presence of a connector cable in connection with a power connection port, as well as the presence of an electronic device on the other end of the connector cable to draw power from the charger unit via the connector cable. Such technology utilizes an internal switch disposed within the charger housing and operatively connected to the rechargeable battery unit that actuates to an "on" position when the appropriate conditions are met. In alternate embodiments, a manual power control switch may also be provided so that the user can still turn the charger unit on and off as desired.

In various embodiments of the present invention, the charger unit may further comprise a controller and internal logic, which can sense the connection of one or more electronic devices with the charger via the power connection port/interface, determine if the charger is connected to an external power source via the power connection port/interface, and coordinate operation of the power connection port/interface as either a power input or a power output, or both. In preferred embodiments, the power connection port/interface can be used as a conduit for charging the internal battery unit from an external power source and as a conduit for charging electronic devices from the charger, often at the same time.

These and other objects, features and advantages of the present invention will become apparent in light of the detailed description of embodiments thereof, as illustrated in the accompanying drawings.

DETAILED DESCRIPTION OF THE DRAWINGS

Figure 1:
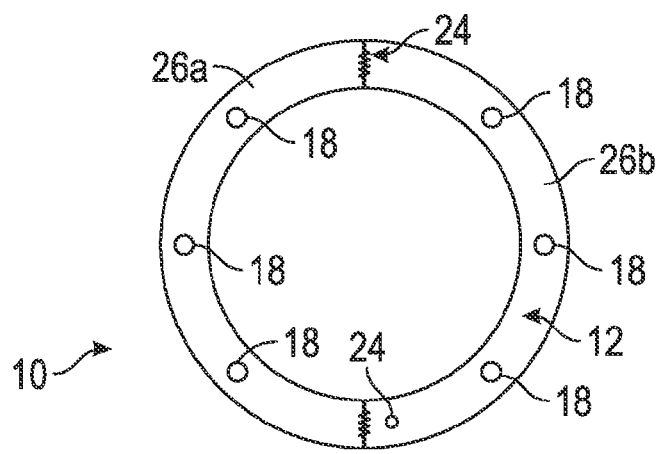
FIG. 1 shows a top planar view of a first embodiment of a wearable and decorative portable charger in accordance with the present invention.

A portable charger in accordance with an embodiment of the present invention is shown in FIGS. 1-4, and generally designated by reference numeral 10. As illustrated, the charger 10 comprises a charger housing 12 having an internal rechargeable internal battery (50 in FIG. 4) for recharging one or more electronic devices via at least one power connection female port or power connection male interface provided in the charger housing 12.

Figure 2:
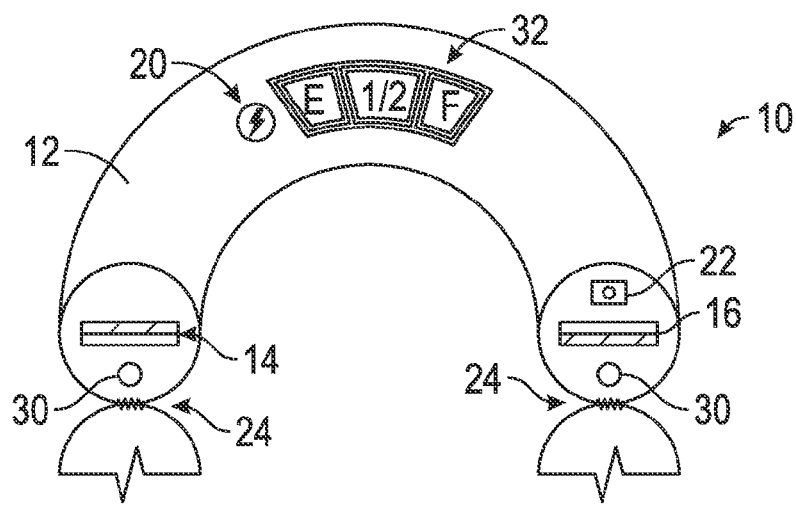
FIG. 2 shows a partial perspective view of the portable charger of FIG. 1.
Figure 3:
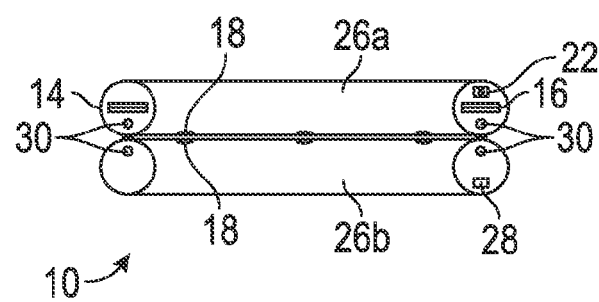
FIG. 3 shows a planar end view of the portable charger of FIG. 1 in an opened condition.

As shown in FIGS. 2-3, there are two power connection ports 14 and 16 designed as female connection ports for connecting the charger 10 to an external power source and/or one or more portable electronic devices in need of recharging. As discussed below, each power connection port can act as a power input, a power output or both in accordance with operation of the present invention. Additionally, each means of connection, be it an input, an output, or both, can take the form of a female connection port, such as illustrated in FIGS. 2-3, or a male connection interface provided on the housing. Indeed, the present invention envisions the use of a male power connection interface, which is shown in combination with a female power connection port in the embodiment of FIGS. 11-14 and as described in more detail below.

In accordance with preferred embodiments of the present invention, the charger housing 12 takes the form of a fashion accessory that facilitates the portability of the power charger 10. For example, as shown in FIG. 1, the charger housing 12 takes the form of a bracelet that can be worn by the user, such as around the wrist. As so designed, the power charger 10 can be easily carried by the user without taking up space and be readily available and easily accessible when needed to provide a power charge to one or more electronic devices.

The portable charger in accordance with the present invention may have a variety of designs, including the embodiments discussed and illustrated herein, and may be provided with connector cables, connection interfaces and adapters suitable for recharging the internal battery of the charger unit from an external power source and recharging the batteries of various electronic devices connected thereto.

The portable charger 10 also includes a flashlight feature that comprises at least one light source or bulb 18 for projecting light from the charger housing 12 as needed. As illustrated in FIG. 1, a plurality of LED lights 18 are disposed around one face of the charger housing 12, each of which are operatively connected with the internal battery 50 of the charger 10, as well as with a power control button 20 provided on the charger housing 12 for turning the lights 18 on and off. Referring to FIG. 2, the power control button 20 for the flashlight feature is provided on the opposite side of the charger housing 12 from the lights 18. In this design, a user can wear the power charger 10 on her wrist with the lights 18 facing her hand and the power control button 20 facing away from the hand. To use the flashlight feature, for example, when the user is reaching into a bag or purse, the power button 20 can be pressed to turn on the lights 18, which can project away from the body into the bag or purse.

Referring to FIG. 2, in an embodiment of the present invention, the charger housing 12 includes a first power connection port 14, a second power connection port 16, and a power control button 22. As shown, the first and second power connection ports 14 and 16 generally take the form of USB ports, but can take the form of any known interface for connecting a device with a power source or another electronic device, including but not limited to a mini-USB interface, a micro-USB interface, or an AC-to-DC connector interface. In the embodiment illustrated in FIGS. 1-3, the first power connection port 14 operates as a power input for recharging the internal battery 50 of the power charger 10, while the second power connection port 16 operates as a power output for charging electronic devices connected to the power charger 10. In alternate embodiments, the power charger 10 can be provided with a single power connection port that can operate as both a power input and a power output depending on what is connected with the power charger (e.g., a two-way charging interface), such as described in co-pending U.S. application Ser. No. 13/682,985, incorporated herein by reference.

In preferred embodiments of the present invention, the power connection ports 14 and 16 of the power charger 10 are hidden within the charger housing 12 so as not to detract from the power charger's use as a fashion accessory. Of course, in various embodiments of the present invention, one or more power connection ports can be provided on the exterior surface of the charger housing, but in preferred embodiments, such as illustrated in FIGS. 1-3, the power connection port(s) are contained within the charger housing 12 and exposed by opening or folding the charger housing 12 for use to recharge an electronic device or recharge the internal battery 50 of the power charger 10.

Figure 10:
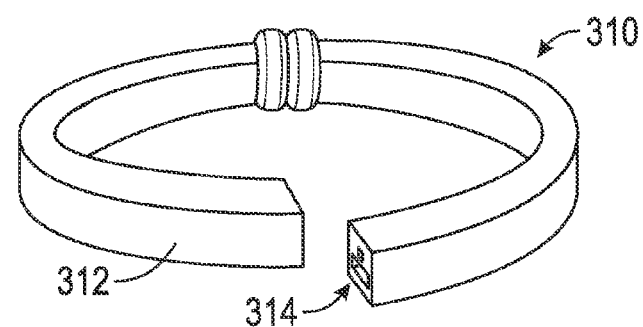
FIG. 10 shows a perspective view of a fourth embodiment of a wearable and decorative portable charger in accordance with the present invention in an opened condition.

In the embodiment shown in FIGS. 1-3, the charger housing 12 is generally provided with one or more hinges 24 to open the housing 12 to expose power connection port(s) and/or interface(s) hidden within the closed housing 12. For example, as shown in the embodiment of FIG. 1, the charger housing 12 can be divided into two semi-circular housing portions 26a and 26b. Referring to the illustrated design, the charger housing 12 includes hinges 24 permitting the ring-shape of the charger 10 to be folded in half, forming stacked semi-circular housing portions 26a and 26b and exposing the power connection input port 14 and the power connection output port 16, as shown in FIG. 3. In alternate designs, the charger housing can include a single hinge that permits the charger housing to open up sideways so that the housing portions generally form a "C" or an "M" shape, while exposing one or more power connection ports for use, as shown in FIGS. 5-6 and 8-9. Still further, the housing can be constructed from a flexible material, and instead of a hinge, merely relies upon a twisting of the housing to expose a power connection port hidden within the closed housing, as illustrated in FIG. 10.

Referring, for example, to FIGS. 2-3, the power connection input and output ports 14 and 16 utilize standard USB female interfaces adapted for engagement with connector cables having a standard USB male interface. Similarly, referring to FIG. 6, a single two-way power connection port 114 utilizes a standard USB female interface for engagement with a connector cable having a standard USB male interface. As so designed, the portable charger concepts described herein can be used with a connector cable having multiple connection interfaces for connecting the charger unit with an external power source for recharging the internal battery unit and one or more electronic devices for recharging from the charger unit, as necessary. In operation, a user can connect the power charger to an electronic device via a power connection output port (e.g., port 16 of FIG. 2), whereby the electronic device is recharged from the internal battery of the power charger. A user may also recharge the internal battery of the charger by connecting the charger with an external power source via a power connection input port (e.g., port 14 of FIG. 2). Additionally, the charger can be connected with an external power source and an electronic device at the same time. In this scenario, the electronic device may be recharged at the same time the internal battery of the charger is being recharged.

In alternate embodiments, instead of power connection ports or in lieu of one of the power connection ports, one or more power connection interface can be provided, such as a standard male USB interface adapted for engagement with a standard USB female port on a portable electronic device, an external power source, or an adapter or charging cable to which the charger can be connected. For example, the male connection interface of the charger unit can be used with a connector cable having multiple connection interfaces for connecting the charger unit with an external power source for recharging the internal battery unit and one or more electronic devices for recharging from the charger unit, as necessary. In operation, a user can connect the power charger to an electronic device via the power connection interface, whereby the electronic device is recharged from the internal battery 50 of the power charger 10. A user may also recharge the internal battery 50 of the charger 10 by connecting the charger 10 with an external power source via the power connection interface—for example, directly into the USB port of a computer. Additionally, the charger 10 can be connected with an external power source and an electronic device at the same time. In this scenario, the electronic device may be recharged at the same time the internal battery 50 of the charger 10 is being recharged.

Figure 11:
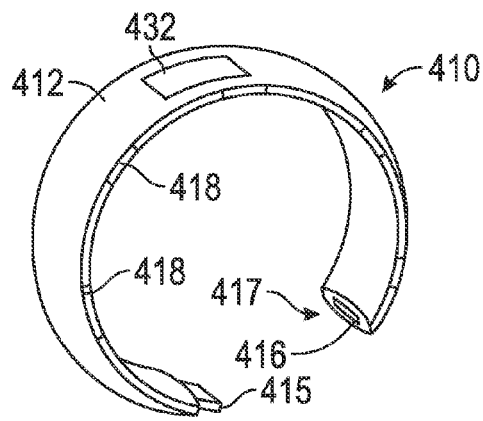
FIG. 11 shows a perspective view of a fifth embodiment of a wearable and decorative portable charger in accordance with the present invention in an opened condition.
Figure 12:
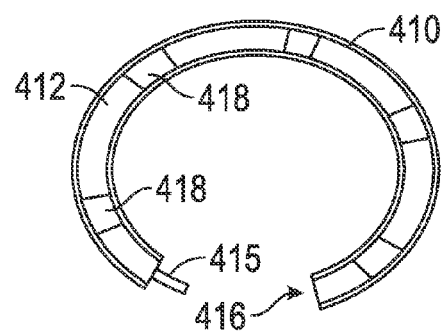
FIG. 12 shows a planar top view of the portable charger of FIG. 11.

Referring to FIGS. 11-12, the charger housing 412 includes a power connection male interface 415 that are exposed when the charger housing 412 is opened. When the charger housing 412 is closed, the interface 415 is contained within a storage cavity 417, preferably, having complementary shape to the interface, and more preferably comprising an operable female connection port. As shown, the male interface 415 generally takes the form of a USB male interface, but can take the form of any known interface for connection to devices having a complementary connection port, including but not limited to a mini-USB interface, a micro-USB interface, an Apple® 30-pin interface, an Apple Lightning® interface, or the like.

In still further embodiments as noted above, the charger housing 412 can be provided with both a power connection port 416 and a power connection interface 415. For example, the female port 416 acts as a power output connection for recharging one or more electronic device connected to the charger 410 via the port 416. The male interface 415 acts as a power input, for connection to an external power source for recharging the internal battery 50 of the charger 410. For example, the male interface 415 can be directly plugged into a USB port of a computer to recharge the charger 410. In designs with both a power connection port 416 and a power connection interface 415, the male interface 415 can be received within the female port 416 when the charger housing 412 is closed. Such engagement can also act to lock the housing 412 in the closed condition.

Referring back to FIGS. 1-3, a power control button may also be provided to turn the power charger 10 on and off. As illustrated in FIG. 2, the power control button 22 is provided above the power connection output port 16. A complementary shaped indent 28 is provided on the other side of the housing 12 in a mirrored location to receive the power control button 22 when the charger housing 12 is closed and unfolded so that the control button 22 is not accidentally pressed when the power charger 10 is being worn as a fashion accessory. As also illustrated, magnets 30 with complementary polar charges are provided on the ends of the housing portions 26a and 26b to aid in keeping the charger housing closed and to prevent unintentional opening of the charger 10, especially when being worn by the user as a fashion accessory. As discussed below, the charger 10 may also utilize an automatic on/off logic for operation of the power charger 10 to recharge an electronic device connected to the charger, thereby obviating the need for a separate power control button.

Figure 4:
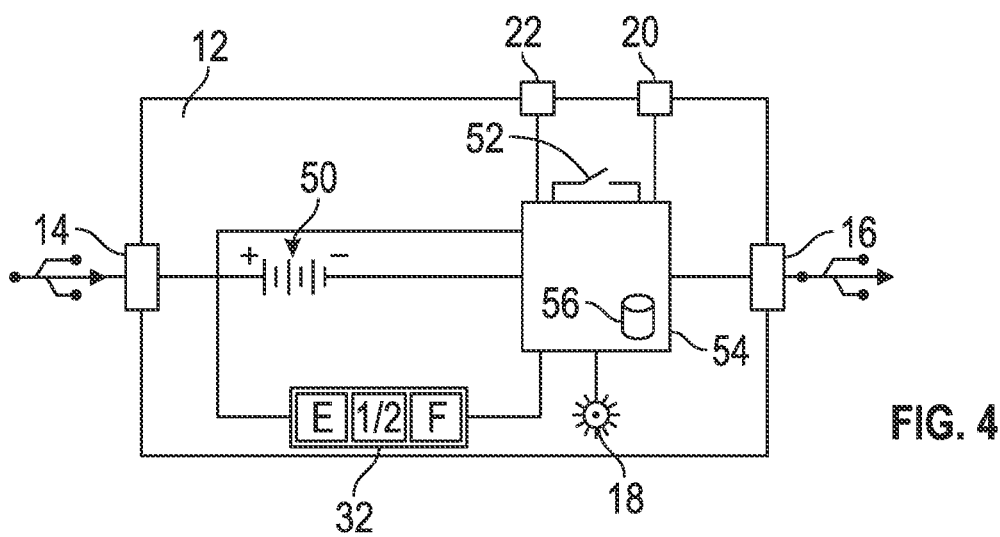
FIG. 4 illustrates a schematic view of internal components of the portable charger of FIG. 1.
Figure 5:
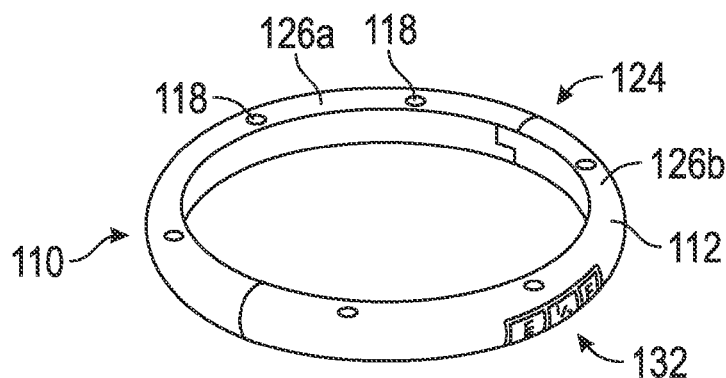
FIG. 5 shows a perspective view of a second embodiment of a wearable and decorative portable charger in accordance with the present invention.
Figure 6:
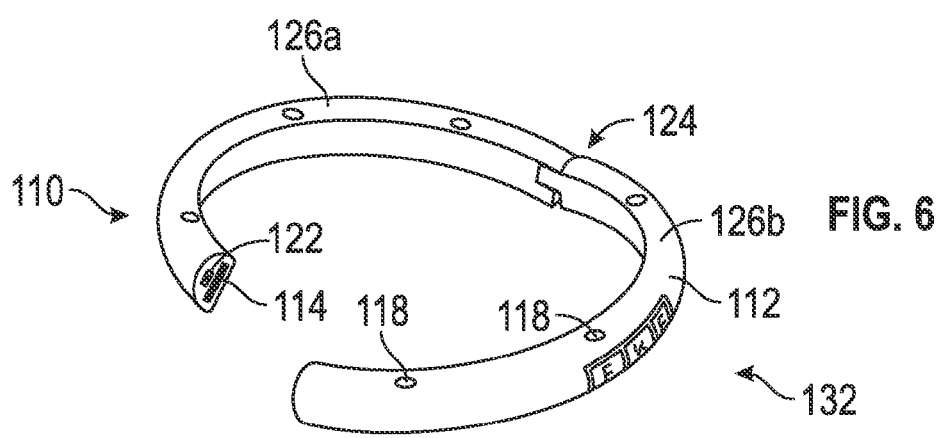
FIG. 6 shows a perspective view of the portable charger of FIG. 5 in an opened condition.

Referring to FIG. 4, the power connection ports/interfaces 14 and 16 of the charger 10 are in operative communication with the internal rechargeable battery unit 50 disposed within the charger housing 12, which is further in operative communication with the power control buttons 20 and 22. Thus, the user can actuate the button 22 to turn the charger 10 "On" to provide a charge to an electronic device via power connection port/interface 16 to which the electronic device is connected. More particularly, the power control button 22 can effect actuation of an internal switch 52 to begin supplying a charge via a power connection port/interface—e.g., output port 16 or another output interface. When the electronic device is fully charged, the switch 52 can be actuated to an "Off" position to stop sending a charge from the internal battery 50 and preserve the battery's charge level. Additionally, when the power control button 22 is pressed to turn the charger "Off", it can likewise effectuate opening of the internal switch 52.

Additionally, the power control button 22 can be used to control the charge sent to the internal battery unit 50 from an external power source. That is, when the button 22 is in its "On" position, a charge can be provided from an external power source to the internal battery unit 50 for recharging, for example, from power connection input port/interface 14.

In alternative embodiments, the portable power charger can utilize an automatic power on/power off methodology, such as described in co-pending U.S. application Ser. No. 13/682,985, incorporated herein by reference, whereby the charger 10 automatically turns on to provide a charge to an electronic device connected to the charger 10 or receive a charge to recharge the internal battery 50 when the charger 10 is connected to an external power source, and automatically turn off when the internal battery unit 50 is fully charged and the respective battery units of electronic devices connected to the charger 10 are fully charged as well. In such a design, operation of the charger 10 is controlled by the internal switch 52, which operates in accordance with internal logic provided in a controller/processing unit 54 of the charger 10. The controller 54 is in operative communication with the internal battery unit 50, the power connection ports/interfaces 14 and 16 provided on the housing 12, the internal switch 52, the lighting feature, and appropriate input/output circuitry for essentially controlling operation of the charger unit 10. An external power control switch (such as the on/off button 22 or the like) may still be provided for such a design as a manual back-up or override—for example, if the user wants to manually turn off the charger 10 to preserve battery instead of waiting for the internal battery unit 50 or an electronic device connected thereto are fully charged.

As noted, the lighting feature is in operative communication with the internal rechargeable battery unit 50 and the controller 54 for use of the lights 18 via power button 20 provided on the charger housing 12. Thus, the user can actuate the button 20 to turn the lights 18 on and off. When the button 20 is pressed, power is sent from the internal battery 50 to turn the lights on or off as desired.

In accordance with intended operation of the portable charger 10 shown in FIG. 1 in accordance with the present invention, a user has the option of recharging one or more electronic devices from a standard power source, such as a computer, a wall socket, a car power outlet, or an airplane power outlet, or using the charger 10 when a standard power source is not readily available. For example, the charger 10 of the present invention can be used to charge smart phones, mobile phones, data tablets, music players, cameras, camcorders, gaming units, e-books, Bluetooth® headsets and earpieces, GPS devices, and the like, either individually or collectively in various combinations when the user is away from a standard power source. To do so, an electronic device can be connected to the charger using a connector cable, as is known in the art.

Figure 7:
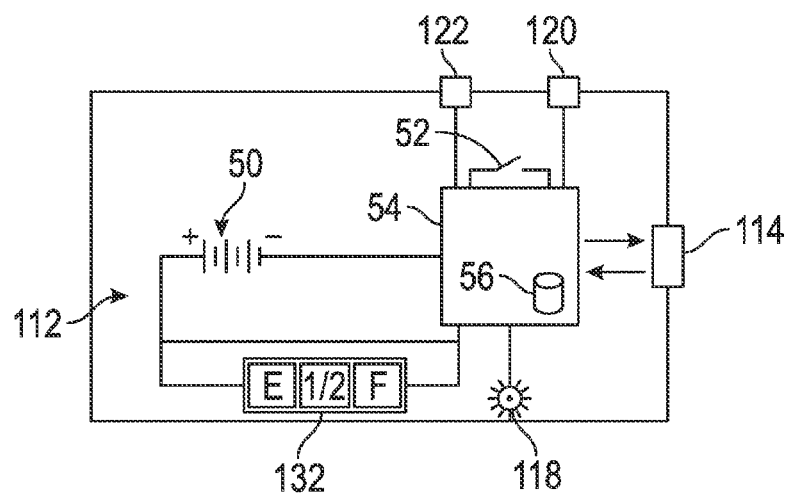
FIG. 7 illustrates a schematic view of internal components of the portable charger of FIG. 5.
Figure 8:
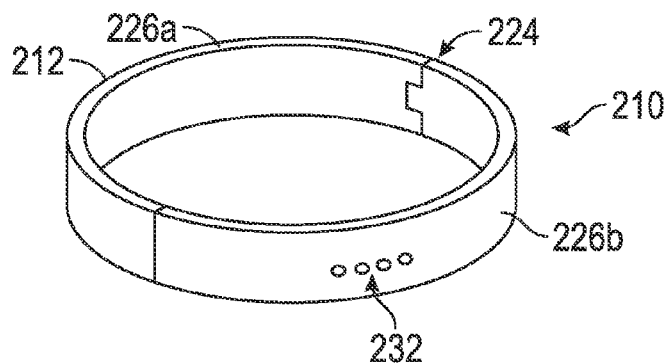
FIG. 8 shows a perspective view of a third embodiment of a wearable and decorative portable charger in accordance with the present invention.
Figure 9:
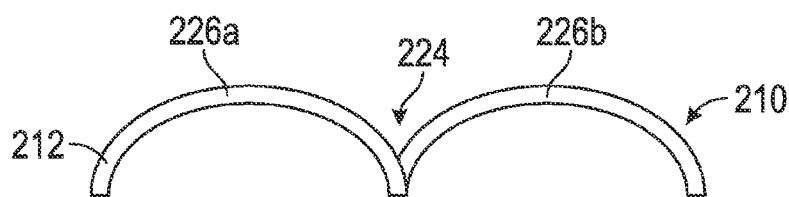
FIG. 9 shows a planar top view of the portable charger of FIG. 8 in an opened condition.

In alternate embodiments of the portable charger unit of the present invention, the power charger unit can utilize a two-way charging interface, such as described and illustrated in co-pending U.S. application Ser. No. 13/682,985, incorporated herein by reference. As shown, for example, in FIGS. 5-7, a portable power charger 110 includes a charger housing 112 having a single power connection port 114 that operates as a two-way charging interface—that is, as both a power input and a power output during operation of the charger 110. In accordance with the present invention, the internal battery unit 50 of the charger 110 can be recharged and electronic devices connected with the charger 110 can be recharged, all from the same power connection port 114. Where such a single power connection port 114 is provided, a conventional split connector cable having multiple connection ends can be used to connect the charger unit 110 with an external power source and one or more electronic devices via the singular connection port 114, as desired, including simultaneously. For example, the portable charger unit 110 of the present invention can be used with the squid connector shown and described in co-pending U.S. application Ser. No. 13/571,992, incorporated herein by reference, or with the connecting cable shown and described for use with a two-way power interface in co-pending U.S. application Ser. No. 13/682,985. Though only shown in FIGS. 5-6 with a single power connection port 114, the present invention can be used with additional portable power chargers that have additional input ports, output ports, or two-way connection ports, such as described above and elsewhere herein.

Figure 13:
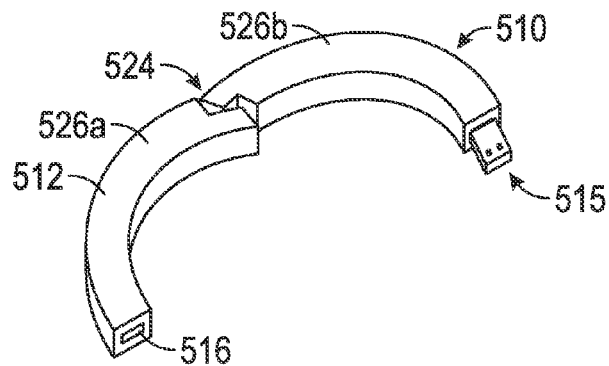
FIG. 13 shows a perspective view of a sixth embodiment of a wearable and decorative portable charger in accordance with the present invention in an opened condition.
Figure 14:
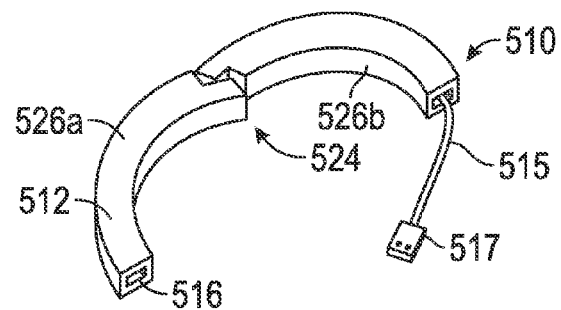
FIG. 14 shows another perspective view of the portable charger of FIG. 13 with a connector cable partially extended from the charger housing.

In alternate embodiments of the present invention, one or more power connector cable may be disposed within the charger housing, either in place of or in addition to power connection ports/interfaces provided in the charger housing. For example, FIGS. 13-14 illustrate an embodiment of a portable power charger 510 in accordance with the present invention comprising a power connection port 516 and a connector cable 515 that can be stored within the charger housing 512. In this regard, the connector cable 515 can be extended from the charger housing 512 for use to connect to an external power source, an electronic device, or both, as desired, and then retracted back within the charger housing 512 when not needed. Similarly, the power connection port 516 can operate as a two-way interface for connection with an external power source, an electronic device, or both, as desired. Still further, each of the power connection port 516 or the connector cable 515 can have dedicated functions. For example, in the embodiment illustrated in FIGS. 13-14, the connector cable 515 can function as a power input, and therefore is used to connect the power charger 510 with an external power source to recharge the internal battery 50 of the power charger 510. Thus, the power connection port 516 could function as a power output for charging an electronic device from the internal battery 50 when the electronic device is connected to the power charger 510 via the power connection port 516.

The cable 515 may even be removable from the charger housing 512 for use with the power connection port 516, with or without adapter pieces, to expand the functionality and flexibility of use of the charger 510 with respect to electronic devices and/or power sources requiring varied and different connection interfaces.

As noted, the connector cable 515 is preferably stored or retracted within the charger housing 512 when not in use. For example, the charger housing 512 can include an internal cavity (not shown) that will accommodate the full size and shape of the connector cable 515 so that it will not interfere with closing the charger housing 512 and use of the power charger 510 as a fashion accessory. When the connector cable 515 is needed, the charger housing 512 can be opened to expose the connector cable 515, which can be pulled from its cavity and extended as necessary. For example, where the charger housing 512 has the shape of a bracelet that can be opened or folded for use as a charger 510, the power connector cable 515 can be exposed when the charger housing 512 is so opened or folded, and thereafter pulled from the cavity formed in the charger housing 512 to increase the versatility and flexibility of use of the charger 510.

As illustrated, the connector cable 515 has a USB interface 517 on the end, though alternate interfaces can be used without departing from the spirit and principles of the present invention. The storage cavity formed in the charger housing 512 (in this case, the connection port 516) can be designed to adequately accommodate the size and shape of the connection interface 517 so that it does not interfere with closing of the charger housing 512 and use of the charger 510 as a fashion accessory. In various embodiments, the connection interface 517 of the connector cable 515 can be adapted to engage the power connection port 516 to close the charger housing 512 and further ensure that the charger housing 512 does not accidentally open while being worn as a fashion accessory.

In use, the USB interface 517 of the connector cable 515 engages a power source either directly, such as by a USB port on a computer, or using a modular adapter tip or multi-functional adapter unit, such as described and shown in co-pending U.S. application Ser. No. 13/801,338, incorporated herein by reference.

In accordance with the present invention, a charger unit is readily portable as a result of the size and shape of the housing. Indeed, by making the charger housing in the form of a fashion accessory, such as a bracelet, a user can easily wear the charger when not in use. Indeed, the charger housing can be provided in a variety of colors, prints or materials to enhance its use as a fashion accessory. By wearing the charger as a bracelet, the portable charger is always with the user, and thus readily available and accessible when needed to recharge an electronic device, such as a mobile phone. Further, by wearing the charger as a bracelet, the portable charger doesn't take up valuable storage space in a user's pocket, bag, backpack or purse.

Despite the small size of the unit, the power capacity is very high so that the charger can accommodate multiple electronic devices at the same time, if necessary. In preferred embodiments, the rechargeable battery unit 50 is a Lithium-Ion battery that can be recharged by connecting the charger to an external power source, such as a computer, a wall socket, a car or an airplane power supply, using a power connector (e.g., connector cable) attached to the power input connection port of the charger. For example, a connector cable having a USB interface on one end can be inserted into the power input connection port 14 of the charger and using a USB interface on the free opposite end, can be inserted into a USB port of a computer or an adapter unit for connection to a standard power source, such as a wall-socket via a standard U.S. plug or a variety of foreign plug styles, a car charger socket—e.g., a cigarette lighter socket—via a car charger interface, or an airplane charger socket via an airplane charger interface, to recharge the internal battery unit or the charger. In embodiments of the present invention, the internal battery 50 can be provided with any level of charge, so that it can either fully charge one or more electronic devices, or merely provide a boost as needed by the user to complete a task, such as finish a phone call.

The rechargeable battery unit 50 is also operatively connected to the lights 18 of the charger 10. This permits use of the lights 18 when it is dark, which can help in use of the charger 10 so that all the components, cables, connection ports, connector interfaces and adapters can be seen to ensure proper engagement and thus proper operation of the charger 10, or simply provide the user with an easily accessible source of light that can be used as necessary apart from use of the charger 10 to recharge an electronic device.

Referring again to FIG. 4, the portable power charger 10 of the present invention comprises a controller, including a processing unit 54, configured to execute instructions and to carry out operations associated with the charger unit 10. For example, the processing unit 54 can keep track of the capacity level of the internal battery unit 50, store data or provide a conduit means by which data can be exchanged between electronic devices, such as between a smart phone and a computer. The processing unit 54 also determines how an electrical charge should be directed within a charger, especially when power connection ports with two-way charging interfaces are provided on the charger.

In each of the illustrated embodiments, the charger housing includes a power indicator means 32 that indicates the remaining capacity of the internal battery 50 in the charger unit. For example, in an embodiment of the present invention illustrated in FIG. 2, the power indicator means 32 comprises a series of lights and designators, which can include more or fewer lights without departing from the principles and spirit of the present invention, that light up to indicate the power level of the internal battery 50. In operation, the processing unit 54 communicates with the battery unit 50 to determine how much capacity is remaining in the battery 50. Upon determining the capacity level, the processing unit 54 communicates with the power indicator means 32 to provide the user with the appropriate signal for showing how much capacity is remaining in the internal rechargeable battery unit 50. For example, when the battery 50 is at full capacity, a designator—e.g., an "F"—is lit up. As the battery power decreases, the lights will correspondingly change as the power is used. For example, where battery is at half or near half capacity, a "½" designator will be lit up. If there is no capacity left in the internal battery unit, an "empty" indicator ("E")" may be lit up. Alternatively, a series of lights that all light up when fully charged and which decrease in number as the battery capacity is used, may provide sufficient battery capacity information. Still alternatively, a single light can change color to indicate the power level. For example, when the charge is high, the light can be green; when the charge is medium, the light can be yellow, and when the charge is low or exhausted, the light can be red. Still further, the power indicator means 32 can comprise a digital interface that provides a battery capacity level for the internal rechargeable battery unit 50, or another known means of providing battery level information.

The power indicator means 32 can also confirm that the internal switch 52 of the charger has been turned "on" by lighting up. The internal switch 52 is operatively connected to the rechargeable battery unit 50 and the power indicator means 32 via the processing unit 54. Once the switch 52 is closed to turn on the charger, the power indicator means 32 will provide an indication that the charger is operating.

Upon shut down of the charger unit, the power indicator means 32 will preferably indicate that the charger is being turned off—for example, the lights will provide a sequential blinking signal. This signal is useful when the charger is automatically shutting off after the relevant batteries have been fully charged and a predesignated time delay has elapsed, as discussed below.

The charger housing 12 may include additional indicator means providing additional information for separate functions of the charger unit. For example, separate indicator means can be provided to indicate that an electrical current is being supplied to one or more electronic devices connected to the charger unit. Alternatively, a second power indicator means can be provided to indicate that the charger is on or off, especially useful in embodiments of the present invention utilizing an automatic activation/deactivation logic that don't require a manual power button. For example, the power control button 22 shown in FIG. 2 can light up—e.g., be backlit by an LED light—to indicate when the charger is in use.

As illustrated in various embodiments herein, a portable power charger in accordance with the present invention generally includes a power control button 20 or switch for turning the flashlight feature on and off. This control button 20 or switch may also be used to control operation of the power charger itself—that is, to provide a charge to electronic devices connected to the power charger, and/or to recharge the internal battery unit of the charger. A power charger in accordance with the present invention may also have an automatic power control for use of the internal battery for recharging without departing from the spirit and principles of the present invention or without affecting use of the flashlight provided with the charger unit. In this regard, the charger unit of the present invention can also include operational logic, as controlled by the processing unit 54, that automatically turns the charger on and off for operation. In preferred embodiments, the charger unit turns on when an electronic device needing charging is connected with the charger via a power connection port. For example, the charger includes an internal switch 52 disposed within the charger housing that preferably actuates to an "On" position when an electronic device is connected to the charger via a power connection port. Once the internal battery 50 of the charger and the battery of any electronic device connected to the charger are fully charged, then the charger will shut off, preferably automatically, and more preferably after a predesignated time delay.

The processing unit 54 also preferably includes a timer for automatically turning the charger off if there is no device attached to the charger for a predetermined period of time, or if the internal battery unit 50 of the charger is fully charged, or if any electronic device attached to the charger is fully charged. In this regard, the capacity of the battery can be preserved. Preferably, there is a time delay before the charger shuts down—for example, once an action is complete, such as the internal battery unit 50 is fully charged, the timer will begin a predesignated time delay, after which the charger will turn off and the battery unit 50 will be deactivated. In the case where the charger is being recharged from an external power source and recharging electronic devices at the same time, the charger will wait until all relevant batteries are fully charged before beginning the time delay for shut off. As noted above, a manual on/off switch (such as power control button 22) can still be provided, and a user can manually shut off the charger at any time as desired. Moreover, even when operation of the internal battery 50 to recharge electronic devices connected to the charger unit is automatically controlled by internal logic, such a charger unit will preferably include a switch or button 20 for controlling operation of the flashlight feature of the charger.

The charger housing generally encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

The processing unit 54 further includes a storage unit 56 that provides a place to hold data or instructions for operation of the charger unit and rechargeable battery unit 50, or data exchanged between the charger unit, a computer, and electronic devices connected to the charger unit, or memory needed for further operations of the charger unit.

Various embodiments of the present invention may further include additional features that improve upon the functionality of the power charger. As noted above, the portable power chargers described herein are wearable and decorative, and thus can be easily function as a fashion accessory, such as a bracelet or loop, that can be worn by a user to increase its portability and ensure that it is available when a power charge is needed, while camouflaging the charger functionality of the device. Additional features can be provided, such as a clock and date screen, a pedometer, or other data indicators to improve upon the function of the device when worn as an accessory. The power connection ports/interfaces can also be used to transfer data gathered by the charger (e.g., when functioning as a pedometer) or to receive data from an external source, such as a computer.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable power charger configured to be worn by a person, said portable charger comprising:
   a housing having a first portion and a second portion, the first portion releasably engaging the second portion;
   at least one hinge between the first portion and the second portion for moving said portions between opened and closed positions of the housing, wherein in said closed position of the housing, the first and second portions engage one another and wherein in said open position of the housing, the first and second portions are separated;
   a rechargeable battery unit internally disposed within the housing;
   a first power connection interface provided on the housing and operatively connected to the rechargeable battery unit, said first power connection interface being capable of acting as at least one of (i) a power input for providing an electrical charge from an external power source for recharging the rechargeable battery unit when the portable charger is connected to the external power source; and (ii) a power output for charging an internal battery of an electronic device from the rechargeable battery unit when said electronic device is connected to the portable charger; and
   a second power connection interface provided on the housing and operatively connected to the rechargeable battery unit, said second power connection interface being capable of acting as at least one of (i) a power input for providing an electrical charge from an external power source for recharging the rechargeable battery unit when the portable charger is connected to the external power source; and (ii) a power output for charging an internal battery of an electronic device from the rechargeable battery unit when said electronic device is connected to the portable charger;
   wherein the first power connection interface comprises a power connection female port and the second power connection interface comprises a power connection male interface, both of which are exposed when the housing is in its opened position and hidden when the housing is in its closed position;
   and further wherein said male interface engages said female port when the first portion of the housing engages the second portion of the housing.

2. The portable power charger according to claim 1, wherein the first power connection interface comprises a power input and the second power connection interface comprises a power output.

3. The portable power charger according to claim 1, further comprising magnets for maintaining the housing in its closed position when the first and second portions are engaging one another.

4. The portable power charger according to claim 1, said charger housing having the shape of a loop that is configured to be worn by a person as a bracelet.

5. The portable power charger according to claim 4, wherein the loop is constructed from a flexible material permitting the first and second portions to be disengaged from one another by flexing the loop.

6. The portable power charger according to claim 4, further comprising at least one light provided on the housing.

7. A portable power charger configured to be worn by a person, said portable charger comprising:
a housing having a first portion and a second portion, the first portion releasably engaging the second portion;
at least one hinge between the first portion and the second portion for moving said portions between opened and closed positions of the housing, wherein in said closed position of the housing, the first and second portions engage one another and wherein in said open position of the housing, the first and second portions are separated;
a rechargeable battery unit internally disposed within the housing;
a first power connection interface provided on the housing and operatively connected to the rechargeable battery unit, said first power connection interface being capable of acting as at least one of (i) a power input for providing an electrical charge from an external power source for recharging the rechargeable battery unit when the portable charger is connected to the external power source; and (ii) a power output for charging an internal battery of an electronic device from the rechargeable battery unit when said electronic device is connected to the portable charger; and
a second power connection interface provided on the housing and operatively connected to the rechargeable battery unit, said second power connection interface being capable of acting as at least one of (i) a power input for providing an electrical charge from an external power source for recharging the rechargeable battery unit when the portable charger is connected to the external power source; and (ii) a power output for charging an internal battery of an electronic device from the rechargeable battery unit when said electronic device is connected to the portable charger;
wherein the first power connection interface comprises a power connection female port and the second power connection interface comprises a retractable charging cable stored within a cavity formed in the housing when retracted, said charging cable having a power connection male interface;
wherein both the female port and the charging cable are exposed when the housing is in its opened position and hidden when the housing is in its closed position;
and further wherein said male interface of the charging cable engages said female port when the first portion of the housing engages the second portion of the housing.

8. The portable power charger according to claim 7, wherein the first power connection interface comprises a power output and the second power connection interface comprises a power input.

9. The portable power charger according to claim 7, further comprising magnets for maintaining the housing in its closed position when the first and second portions are engaging one another.

10. The portable power charger according to claim 7, said charger housing having the shape of a loop that is configured to be worn by a person as a bracelet.

11. The portable power charger according to claim 10, wherein the loop is constructed from a flexible material permitting the first and second ends to be disengaged from one another by flexing the loop.

12. The portable power charger according to claim 10, further comprising at least one light provided on the housing.

13. A portable power charger configured to be worn by a person, said portable charger comprising:
a housing having the shape of a loop that is configured to be worn by a person as a bracelet and defining a first end and a second end, the first end releasably engaging the second end, said housing having a closed loop condition when the first and second ends are in engagement with one another and an opened condition when said first and second ends are separated;
a rechargeable battery unit disposed within the housing;
a power connection female port provided on one of the first and second ends of the charger housing and operatively connected to the rechargeable battery unit, said power connection female port being capable of acting as at least one of (i) a power input for providing an electrical charge from an external power source for recharging the rechargeable battery unit when the portable charger is connected to the external power source; and (ii) a power output for charging an internal battery of an electronic device from the rechargeable battery unit when said electronic device is connected to the portable charger; and
a power connection male interface provided on the other of the first and second ends of the charger housing and operatively connected to the rechargeable battery unit, said power connection male interface being capable of acting as at least one of (i) a power input for providing an electrical charge from an external power source for recharging the rechargeable battery unit when the portable charger is connected to the external power source; and (ii) a power output for charging an internal battery of an electronic device from the rechargeable battery unit when said electronic device is connected to the portable charger;
wherein both the female port and the male interface are exposed when the housing is in its opened condition and hidden when the housing is in its closed condition;
and further wherein said male interface engages said female port when the first end of the housing engages the second end of the housing.

14. The portable power charger according to claim 13, further comprising at least one light provided on the housing.

15. The portable power charger according to claim 13, wherein the power connection male interface comprises a retractable charging cable stored within a cavity formed in the housing when retracted.

16. The portable power charger according to claim 13, further comprising at least one hinge located at a position on the housing between the first end and the second end to define a first portion of the charger housing and a second portion of the charger housing and for moving said portions between the opened and closed loop conditions of the housing.

* * * * *